United States Patent [19]

Hill et al.

[11] Patent Number: 5,188,879

[45] Date of Patent: Feb. 23, 1993

[54] POLYIMIDE FOAM FILLED STRUCTURES

[75] Inventors: Francis U. Hill, San Diego, Calif.; Paul F. Schoenzart, Leverkusen; Werner P. Frank, Bergisch Gladbach, both of Fed. Rep. of Germany

[73] Assignee: Sorrento Engineering Corporation, National City, Calif.

[21] Appl. No.: 729,596

[22] Filed: Jul. 15, 1991

[51] Int. Cl.⁵ .............................................. B32B 3/12
[52] U.S. Cl. ................................ 428/117; 428/308.4; 264/321
[58] Field of Search ............ 428/116, 117, 119, 308.4, 428/458, 473.5; 264/321, 126, 161; 156/245

[56] References Cited

U.S. PATENT DOCUMENTS

| | | | |
|---|---|---|---|
| 3,556,917 | 1/1971 | Eakin et al. | 428/117 |
| 4,061,812 | 12/1977 | Gilwee, Jr. et al. | 428/473.5 |
| 4,249,974 | 2/1981 | Wilson | 156/252 |
| 4,284,457 | 4/1987 | Stonier et al. | 156/247 |
| 4,657,615 | 4/1987 | Braun et al. | 156/245 |
| 4,687,691 | 8/1987 | Kay | 428/117 |
| 4,855,332 | 8/1989 | Indyke | 264/26 |
| 4,859,530 | 8/1989 | Roark et al. | 156/307.3 |
| 4,865,784 | 9/1989 | Hill | 264/45.3 |
| 4,921,745 | 5/1990 | Mitsui et al. | 428/473.5 |
| 4,964,936 | 10/1990 | Ferro | 264/321 |
| 5,034,256 | 7/1991 | Santiso, III et al. | 428/117 |

*Primary Examiner*—Allan R. Kuhns
*Attorney, Agent, or Firm*—Frank D. Gilliam

[57] ABSTRACT

A method of manufacturing polyimide foam filled structures such as honeycomb panels. A polyimide foam precursor is prepared in powder form. A layer of the powder is heated and foamed at the resin condensation temperature and pre-cured to an easily handleable, stiff and inflexible state. A multi-cell, thin-walled structure having open cells along a surface is pressed into and through the foam sheet so that foam pieces fill the cells. The foam is then heated to a final cure temperature at which the foam becomes stable, resilient and flexible. Face sheets may be bonded to the structure to retain the foam pieces in the cells. If desired, the walls of the structure that contact the foam may be coated with an adhesive, such as a liquid polyimide adhesive resin precursor, so that the foam will be bonded to the cell walls when the liquid resin precursor is cured as a necessary result of the final foam cure conditions.

8 Claims, 1 Drawing Sheet

POLYIMIDE FOAM FILLED STRUCTURES

BACKGROUND OF THE INVENTION

This invention relates in general to foam-filled structures and, more specifically, to methods of making polyimide foam filled structures such as honeycomb panels.

Polyimide resins, as coatings, adhesives, foams and the like have come into widespread use due to their chemical inertness, strength, high temperature resistance and flame resistance. Polyimide foam in the form of sheets and panels are often used as thermal insulation in high temperature environments. Typical polyimide foams include those described in U.S. Pat. Nos. 4,425,441 (Gagliani et al), 4,426,463 (Gagliani et al), 4,518,717 (Long et al), 4,562,112 (Lee et al), 4,621,015 (Long et al) and 4,647,597 (Shulman et al).

Sheets and panels of foam are generally made by causing a layer of liquid or powder precursor on a flat surface to foam without restriction, then slicing the foam at a desired thickness parallel to the surface, to remove the rind that forms on the free surface. This generally produces a foam sheet of optimum uniformity and low density. These sheets may then be adhesively bonded to face sheets to form walls, insulating panels or the like. While useful in many applications, these panels may not have sufficient strength and stiffness for some applications.

The liquid or powder polyimide foam precursor may also be heated to the foaming and curing temperatures in a closed mold coated with a mold release to form a sheet or other desired shaped foam product as described, for example, by Gagliani et al in U.S. Pat. No. 4,425,441. While a variety of shapes may be formed, the restricted foam expansion often produces foams of uneven density and higher overall density than is generally desired. Foaming may also take place between face sheets so that the foam bonds to the face sheets, forming a composite panel. Again, the foam tends to be uneven in density and higher in density than is preferred for insulation and other applications. Also the final structure may not have sufficient strength and stiffness for some purposes.

As described by Ferro et al in U.S. Pat. No. 4,898,763, fully cured polyimide foam has been subjected to steam at high temperatures resulting in hydrolysis of the foam, rendering it non-flexible and non-resilient. The foam can then be pierced by pressing it into a mold such as a honeycomb core. This foam, however, has less desirable physical properties as a result of this complex, expensive and degrading process.

Thus, there is a continuing need for improved methods for producing complex, high strength, structures filled with uniform low density polyimide foam.

SUMMARY OF THE INVENTION

It is, therefore, an object of this invention to provide a method for filling complex structures, such as honeycomb panels, with polyimide foam. Another object is to provide an improved high strength panel having uniform low density polyimide foam filling the cells of a multicellular panel structure. A further object is to provide a method of producing a honeycomb panel structure filled with very uniform, very low density polyimide foam bonded to the structure.

The above objects, and others, are accomplished in accordance with this invention by a polyimide foam filled structure made by the method which comprises the steps of preparing a liquid polyimide foam precursor, drying the liquid to a finely divided dry precursor, forming a layer of said powder on a surface, heating said layer to the foaming temperature, further heating the resulting foam sheet to a pre-cured, non-flexible, non-resilient, state, pressing a multi-cell structure having thin inter-cell walls substantially perpendicular to the structure surface against said foam sheet to cut through said foam and at least partially fill said cells with foam and curing said foam.

Once the structure has cut through the foam sheet, face sheets may be bonded to the face of the structure that had cut the foam to retain the foam pieces in the cell. Any suitable bonding method may be used to secure the face sheet or sheets in place, such as adhesive bonding with a conventional polyimide adhesive or any other suitable adhesive.

If desired, the structure may be coated with an adhesive, such as a polyimide adhesive, prior to the cutting operation. Then, the adhesive will hold the cut foam in place in the cells. A polyimide adhesive will conveniently cure at the same time and temperatures as used for the final foam curing. Face sheets can also be bonded with a polyimide adhesive at the time the foam in the cells is cured.

Any suitable cellular structure may be used. A preferred structure is the well-known honeycomb panel structure having a plurality of hexagonal, square, or otherwise shaped cells through a panel with the cells oriented perpendicular or at an angle to the panel surface. Structures with circular or other curved cell cross sections may also be used. The structure may be formed from any suitable materials including metals such as aluminum or titanium, composites such as fiber reinforced resins or the like. Preferred materials include polyimide matrix resins reinforced with fibers such as glass, aramids, graphite, etc.

BRIEF DESCRIPTION OF THE DRAWINGS

Details of the invention, and certain preferred embodiments thereof, will be further understood upon reference to the drawing, wherein.

DETAILED DESCRIPTION OF PREFERRED EMBODIMENTS

Figure 1:
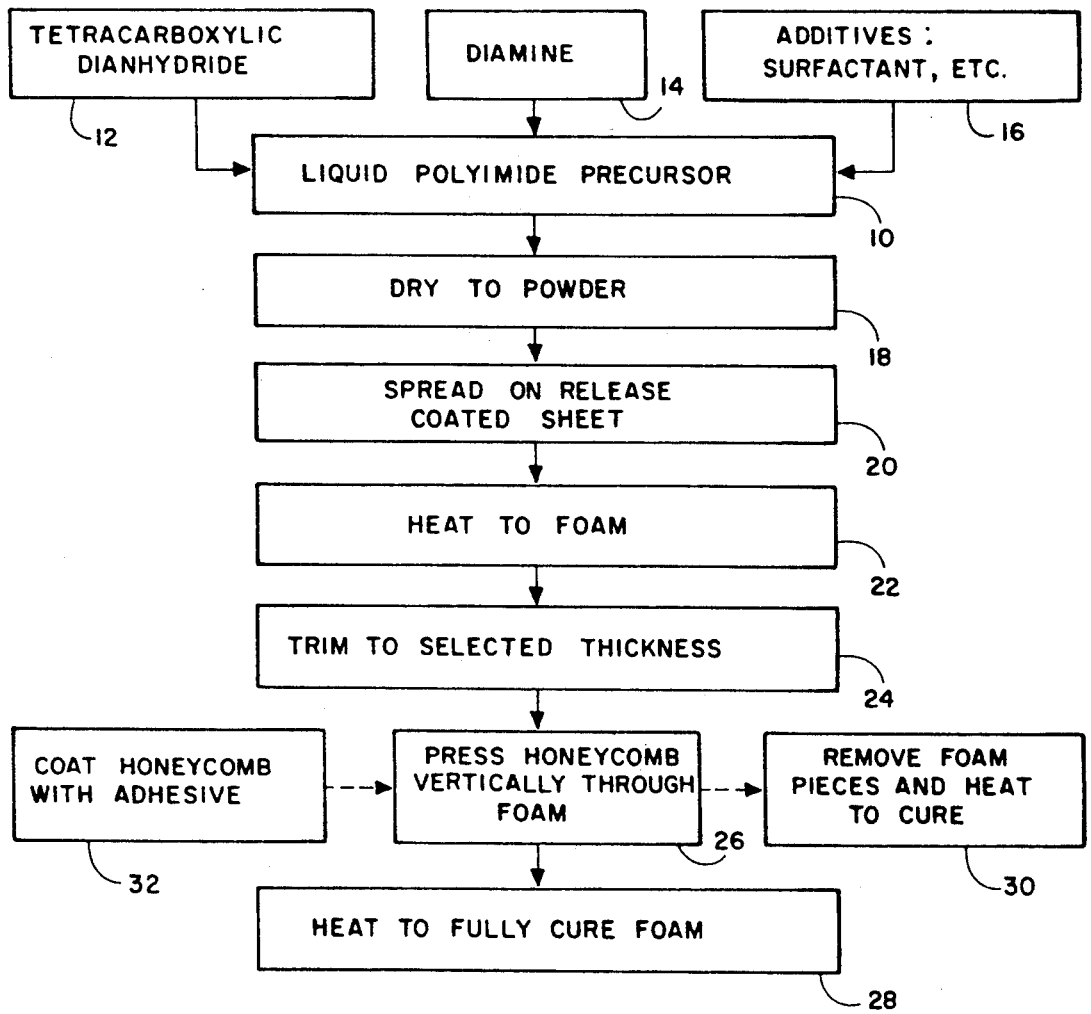
FIG. 1 shows a schematic block diagram of the method of this invention.

Referring now to the drawing, there is seen a schematic block diagram of a preferred method according to this invention. A precursor polyimide resin as indicated in block 10 is prepared by reacting a suitable dianhydride with a suitable diamine as indicated in blocks 12 and 14. Any suitable additive, such as surfactants, reinforcements, fillers and the like may be added to the reactants as indicated in block 16.

In general, the reactants and foamable resin forming methods described in the list of patents relating to foamable polyimide materials provided above may be used. Typically, a tetracarboxylic dianhydride is dissolved in a suitable solvent and converted to a partial ester, then a polyamine such as metaphenylene diamine and any desired additives are added. The resulting precursor resin may be used as a liquid or, preferably, dried to a powder prior to foaming.

Any suitable dianhydride may be used in the preparation of the precursor resin. Best results are generally obtained with 3,3',4,4'-benzophenone tetracarboxylic acid dianhydride (BTDA).

Any suitable diamine may be used. Typical diamines include aromatic diamines such as meta-phenylene diamine, para-phenylene diamine, 4,4'-diaminodiphenyl ether, 4,4'-diaminodiphenyl sulfone, 3,3'-diaminodiphenyl sulfone, 4,4'-diaminodiphenyl sulfide, 4,4'-diamino diaminodiphenyl methane, 3,3'-diaminodiphenyl methane mixtures thereof. If desired aliphatic diamines may be used in combination with these aromatic diamines. Typical aliphatic diamines include 1,3-diamino propane, 1,4-diamino butane, 1,6-diamino hexane, 1,8-diamino octane, 1,12-diamino dodecane and mixtures thereof.

Any suitable additives, such as surfactants fillers, reinforcements, etc., may be added to the reactants as desired. Typical surfactants include FC430 from 3M, Zonyl FSC from duPont, 190 from Dow Corning and L550 from Union Carbide. Other additives include ultraviolet absorbers, filler such as talc or glass powder, reinforcements such as chopped glass or Aramid fibers, etc.

The precursor polyimide resin is then dried to a finely divided powder as indicated in block 18. Any suitable drying method may be used. Typical methods include simple drying in an oven at a temperature of about 60°-90° C., spray drying, rotary drying, thin film evaporation, etc.

The powder is then spread in a uniform layer to a selected thickness on a mold-release coated sheet as indicated in block 20. Typically, the sheet may be a sheet of Teflon fluorocarbon coated glass fiber cloth, liquid mold release coated aluminum or the like. The powder is then heated at the resin condensation temperature to foam the powder as indicated in block 20. The condensation temperature will vary depending on the type of precursor used. Heating is carefully controlled to assure that the foam only precures to an easily handled, shape retaining, state as indicated in block 22 and that no further curing occurs. The foam in this state is friable, non-resilient and non-flexible. Excessive cure at this point will make the foam too resilient and flexible for proper cutting and shaping in the following steps.

The sheets of foam will have a rind on the upper surface and a somewhat varying thickness. The sheets are then trimmed to the desired thickness and other dimensions, as indicated in block 24.

The multi-cell structure, preferably a honeycomb structure, is then pressed into and through the foam sheet, as indicated in block 26. As discussed above, any structure having plural cells with thin walls so that the walls will cut through the foam and allow the foam to extend up into the cells may be used. For convenience, these varied structures will be referred to as "honeycomb" structures for the purposes of this application. Typical honeycomb structures have hexagonal, square or rectangular cell cross sections with thin metal or composite walls.

The foam is then heated to the final cure temperature for a suitable period as indicated in block 28 to cure the foam to the desired physical characteristics, such as flexibility and resilience. The foam may be cured while in the honeycomb or may be removed and cured separately, as indicated in block 30. The foam in this state can be easily removed and replaced in the honeycomb. Generally, there is a friction fit so that the honeycomb can be lifted with few, if any, foam pieces falling out.

Face sheets may, if desired, be bonded to one or both faces of the honeycomb to retain the foam pieces in the cells. Any suitable bonding method can be used, such as adhesives, low temperature solders, etc.

As indicated in block 32, if desired the walls of the honeycomb cells may be coated with an adhesive prior to pressing the honeycomb into the foam in block 26. Then, the foam pieces produced by the cutting action will be bonded to the honeycomb cells. Preferably, a polyimide adhesive such as those described by Gagliani et al in U.S. Pat. No. 4,444,823 is used to coat the cell walls since that adhesive will cure during the final cure step of block 18 and will have high temperature resistance and other properties similar to those of the foam.

The cell walls and cell edges could be coated with the adhesive, so that face sheets could be applied to the honeycomb after the pressing step of block 26 so that a single curing step can fully cure the foam, bond the foam to the cell walls and bond the face sheets to the honeycomb. Alternatively, the honeycomb cell walls and the inner surfaces of the face sheets could be coated with the adhesive, so that during final foam cure the cell walls are bonded to the foam pieces and the face sheets are bonded to both the foam pieces and the edges of the cells.

Figure 2:
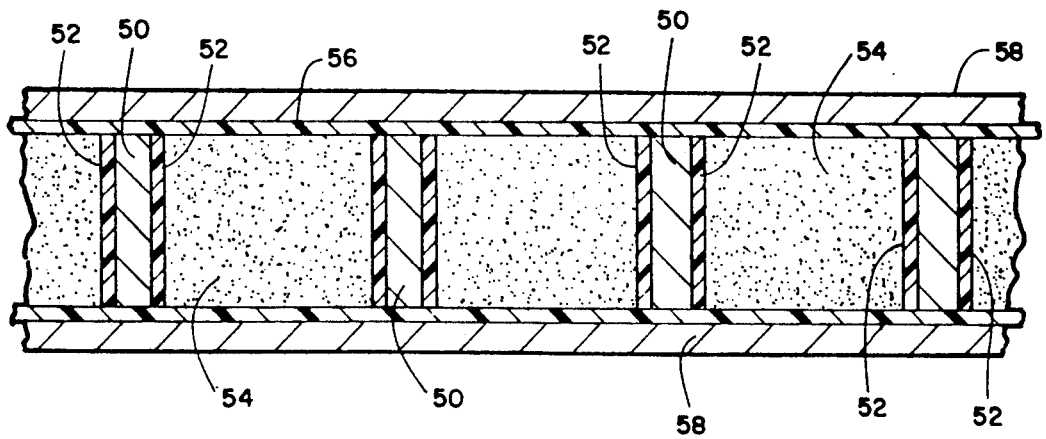
FIG. 2 is a schematic vertical section view through a product of the method of FIG. 1.

The final product of this embodiment is illustrated in the section view of FIG. 2 through the product taken perpendicular to the panel surface. Honeycomb cell walls 50 are coated with adhesive 52 to bond cell walls 50 to foam 54. Adhesive layers 56 on face sheets 58 bond the face sheets to the edges of cell walls 50 and to foam 54.

Further details of the method of this invention will be understood upon reference to the following Examples, which detail the steps and materials used in certain preferred embodiments. All parts and percentages are by weight, unless otherwise indicated.

EXAMPLE I

A foamable polyimide precursor powder is prepared as described by Lavin et al in Example 1 of U.S. Pat. No. 3,554,939. A solution of the diethyl ester of benzophenone tetracarboxylic dianhydride (BTDA-diEt) is prepared by refluxing a suspension of about 450 g. of benzophenone tetracarboxylic acid dianhydride (BTDA) in about 800 ml. of ethanol for about 1 hour, cooling the solution and adding thereto about 150 g. of m-phenylene diamine (m-PDA). The resulting solution is then dried to a powder in film drier. This powder is spread on a Teflon fluorocarbon coated metal plate. The coated plate is placed in a thermal oven and maintained at a temperature of about 190° C. until foaming and the condensation reaction is complete. The temperature is then reduced to about 120° C. for a period of about 1 hour for pre-curing. The resulting foam has a varying thickness and a dense rind on the upper surface. The foam is substantially stiff and inflexible. The foam is trimmed to a thickness of about 19 mm. A honeycomb core sheet made from Nomex reinforced phenolic resin from Hexcel Corp, Dublin Calif., is obtained. The honeycomb sheet has a thickness of about 19 mm and has 6 m square cells lying perpendicular to the sheet surfaces. The honeycomb sheet is pressed into and through the foam sheet which fills the cells. The core with foam in place is placed in a thermal oven and the foam is cured for about 1 hour at a temperature of about 22° C. to achieve the desired polymerization. When fully cured, the foam is resilient and flexible and is stable in the presence of heat and most solvents. A pair of thin sheets of Nomex reinforced phenolic resin from Hexcel are coated with a phenolic adhesive and bonded to the faces of the honeycomb. A sturdy, stable, high temperature resistant insulating structural panel results.

EXAMPLE II

The process described in Example I is repeated, except that a quantity of the resin precursor powder is dissolved in ethanol to give a very thin solution. This solution is sprayed onto the honeycomb cell walls prior to pressing the honeycomb into the foam sheet. After completion of the full cure of the foam, the foam pieces in the cells are found to have firmly bonded to the cell walls.

EXAMPLE III

The process described in Example I is repeated with the following changes. A quantity of the resin precursor powder is dissolved in ethanol to give a very thin solution. This solution is sprayed on the honeycomb cell walls prior to pressing the honeycomb into the foam. One surface of each face plate is sprayed with that solution and the faceplates are placed on the pre-cured foam filled honeycomb. The assembly is placed between press platens and placed in a thermal oven and heated to about 240° C. for about 1 hour to cure the foam and the coatings. A product with the foam well bonded to both the faceplates and the cell walls results.

EXAMPLE IV

About 150 g. of Monsanto 2601 unadulterated Skybond liquid polyimide precursor is mixed with about 0.5% by weight Dow Corning 193 surfactant. The solution is rolled onto a glass plate and air dried with warm air at about 150° C. The dried coating is scraped off of the glass and ground to a fine powder in a conventional kitchen blender. The powder is spread over a Teflon fluorocarbon coated sheet and foamed in a circulating air oven at about 350° C. for about 45 minutes. An aluminum honeycomb having hexagonal cells is pressed into and through the stiff, inflexible precured foam. The assembly is heated to about 575° C. for about 1 hour to fully cure the foam. Two aluminum sheets having a thin layer of adhesive layer are placed on the sides of the honeycomb and the adhesive is cued. A lightweight structural panel having excellent thermal insulation characteristics results.

Other applications, variations and ramifications of this invention will occur to those skilled in the art upon reading this disclosure. Those are intended to be included within the scope of this invention, as defined in the appended claims.

We claim:

1. A polyimide foam-filled multi-cell structure made by a method which comprises the steps of:
   providing a quantity of thermally foamable polyimide precursor powder;
   foaming said precursor powder at the condensation temperature of said precursor;
   heating the resulting foam sufficiently to pre-cure the resulting foam to a substantially inflexible, stiff state;
   trimming said foam to a selected thickness;
   providing a multi-cell honeycomb structure having interior side walls;
   coating at least a portion of the interior side walls of the multi-cell honeycomb structure with an adhesive;
   pressing said multi cell honeycomb structure having said interior side walls, into said foam whereby said foam is cut by said walls and said foam substantially fills said cells; and
   heating the resulting assembly of the honeycomb structure and foam to the curing temperature of said foam and maintaining said assembly at that temperature for a period sufficient to substantially fully cure said foam and allow said adhesive to bond said foam to said interior side walls.

2. The structure according to claim 1 further including a face sheet bonded to at least one side of said honeycomb structure.

3. The structure according to claim 1 wherein said steps further comprises coating at least some portions of at least one face sheet with a polyimide precursor adhesive, bringing said face sheet into contact with said assembly prior to curing said foam with at least some of said adhesive sandwiched between said interior side walls and face sheet; and curing said adhesive during said foam curing step.

4. The structure according to claim 1 wherein said adhesive is a polyimide precursor adhesive which is cured during said foam curing step.

5. The structure according to claim 1 wherein said method further includes the steps of substantially uniformly coating said interior side walls with a polyimide precursor adhesive prior to said pressing step and substantially uniformly coating at least one face sheet with a polyimide precursor adhesive, and pressing said face sheet against the assembly of foam and honeycomb structure prior to curing said foam, whereby the adhesive coatings are cured when said foam is cured so that said foam, interior side walls and face sheet are securely bonded together.

6. The structure according to claim 5 wherein said adhesive coatings are formed from a quantity of the same foamable polyimide precursor used to form said foam, but which is dissolved in a solvent.

7. The structure according to claim 1 wherein said structure is a honeycomb panel having a plurality of parallel cells substantially perpendicular to the panel surface.

8. The structure according to claim 7 wherein said honeycomb panel is formed from a material selected from the group consisting of metals and fiber reinforced resin matrices.

* * * * *